Patented May 5, 1953

UNITED STATES PATENT OFFICE 2,637,646

DEFOLIANT COMPOSITION

Milton Kosmin, Dayton, Ohio, assignor to Monsanto Chemical Company, St. Louis, Mo., a corporation of Delaware No Drawing. Application January 24, 1952,
Serial No. 268,139

3 Claims. (Cl. 71—2.5)

The present invention relates to defoliating compositions and methods of defoliating living plants.

I have found that improved, very efficient defoliant compositions are obtained when there are prepared oil-in-water emulsions of 2-allylmercaptobenzothiazole. The word "oil" is here used to designate any liquid which is insoluble in water. The emulsions may be obtained by first dissolving the benzothiazole derivative in an organic material which is a solvent therefor and then mixing the organic solution with water in the presence of an emulsifying agent. Because of the high defoliating efficiency of 2-allylmercaptobenzothiazole, and the efficiency with which organic solutions of the same may be dispersed in an aqueous vehicle, extremely good defoliant properties are evidenced by emulsions having only very small concentrations of the allyl compound, for example, concentrations of from 0.1 per cent to 2 per cent by weight of the total weight of the emulsion.

Emulsifying agents which may be employed are those customarily used in the art for the preparation of oil-in-water emulsions, e. g., ionic or non-ionic emulsifying or dispersing agents such as the long-chain alkylbenzenesulfonates or polyglycol ethers. The emulsifying agents are likewise employed in only very small concentrations, say, in a quantity of from 0.5% to 2.0% by weight of the total weight of the emulsion, and hence do not affect the chemical stability of the active ingredient.

The present defoliating compositions are particularly valuable defoliants in that when the allyl compound is present in the emulsion in only very small concentrations, e. g., in concentrations of up to 1% by weight based on the total weight of the emulsion, they cause rapid and efficient leaf removal without severely injuring the stem and root systems of the plant. Hence they may be employed at various times of the growing season for the purpose of reducing luxuriant leaf growth and thus facilitating exposure of fruits to sunlight and air, inhibiting insect and fungus growth, and preventing leafworm infestation. The present emulsions are likewise useful for defoliating annual or perennial plants prior to harvesting of non-leafy crops, e. g., cotton, bean, peas, berries, nuts, fruits, etc. Application of the present defoliants to such plants results in leaf-drop and thus permits more efficient machine-harvesting or hand-picking of the bolls, pods, etc.

The present invention is further illustrated, but not limited, by the following example.

Example

Defoliating efficiency of the present emulsions was demonstrated as follows:

2-allylmercaptothiazole was dissolved in cyclohexanone, and enough of the resulting solution was added to a 0.2% aqueous solution of an emulsifying agent to make up 1.0% and 0.3% emulsions, respectively, of the 2-allylmercaptobenzothiazole. The emulsifying agent employed here was a commercial product known to the trade as "Emulsifier L" and comprising a mixture of a polyalkylene glycol derivative and an alkylbenzenesulfonate; however, any standard emulsifying agent could have been employed.

Three-week bean plants were sprayed with the respective emulsions, two plants being employed with each emulsion. The spraying was continued until droplets formed on and/or fell from the foliage and stems of the sprayed plants, up to 15 ml. of the emulsion being applied to each plant. The sprayed plants were then allowed to remain under standard conditions of sunlight and watering for a period of one week. At the end of that time observation of the plants showed that those which had been sprayed with the 1.0% emulsion were severely injured and had dropped all of their leaves, whereas those which had been sprayed with the 0.3% emulsion showed leaf-drop and only slight injury.

While 2-allylmercaptobenzothiazole is most advantageously used as a defoliant when incorporated into an oil-in-water emulsion, it may also be mixed with solid carriers such as clay, talc, pumice and bentonite to give herbicidal compositions which may be applied in toxic quantities to undesired leaf growth. The compound may also be mixed with liquid or solid agricultural pesticides, e. g., insecticides and/or fungicides. While solutions of the benzothiazole derivative in organic solvents therefor may be employed as defoliants we have found that the oil-in-water emulsions of the compound possess an improved tendency to adhere to plant foliage, and that the emulsions require less of the active ingredient to give comparable defoliant efficiency than do the organic solutions or the dry mixtures.

What I claim is:

1. A plant defoliant comprising an oil-in-water emulsion of 2-allylmercaptobenzothiazole as the active ingredient.

2. A method of defoliating plants which comprises applying to the leaves of said plants, in a quantity sufficient to cause the leaves to drop off said plants, a defoliating composition containing 2-allylmercaptobenzothiazole as the active ingredient.

3. A method of defoliating plants which comprises applying to the leaves of said plants a defoliant composition comprising an oil-in-water emulsion of 2-allylmercaptobenzothiazole, said composition being applied to said leaves in a quantity sufficient to cause the leaves to drop off said plants.

MILTON KOSMIN.

No references cited.